Aug. 19, 1958 H. J. SPENCER 2,847,673

FASTENER APPLYING DEVICE

Filed Aug. 15, 1956 3 Sheets-Sheet 1

INVENTOR.

BY Herman J. Spencer

Aug. 19, 1958 H. J. SPENCER 2,847,673

FASTENER APPLYING DEVICE

Filed Aug. 15, 1956 3 Sheets-Sheet 2

INVENTOR.

BY Herman J. Spencer

Aug. 19, 1958 H. J. SPENCER 2,847,673
FASTENER APPLYING DEVICE
Filed Aug. 15, 1956 3 Sheets-Sheet 3

INVENTOR.

BY Herman J. Spencer

United States Patent Office 2,847,673

Patented Aug. 19, 1958

2,847,673

FASTENER APPLYING DEVICE

Herman J. Spencer, Ingomar, Pa.

Application August 15, 1956, Serial No. 604,156

7 Claims. (Cl. 1—49)

This invention relates to improvements in a device for stapling multiple thicknesses of material together.

This application contains improvements to the mechanisms described in my prior Patents No. 2,427,028, issued September 9, 1947; No. 2,749,547, issued June 12, 1956; No. 2,799,859, issued July 23, 1957; and No. 2,814,042, issued November 26, 1957.

In my Patent No. 2,814,042, a flat spring attached to the support bar is disengaged from a hardened control arm and the spring wears out prematurely as it cannot remain flexible if hardened sufficiently for long wear. Some of the extreme positions of the adjustable eccentric plates used in my Patent No. 2,814,042 tilt their anvil plate guiding slots too much off of a vertical line to thereby swing the anvil plates an undesirable degree transversely in the machine and this extreme transverse movement of the anvil plates requires a wider operating space and presents difficulty in holding the anvil plates in proper engagement with the driver.

One object of this invention is to provide adjustable guiding means for the anvil plates that maintains a more vertical guide when adjusted.

Another object is to provide inexpensive parts that are easy to operate for adjusting the anvil plates to various staple bending positions.

A further object is to provide means to positively control movement of the support bar during the driving of a staple and means for releasing the first means with all wearing parts being of such design that they can be hardened for long life.

Another object is to provide means for locking the anvil plates in their lowered position and to provide operable means operated by the driver during its upward movement to release the locking means to permit retraction of the anvil plates.

In the accompanying drawings which illustrate my invention—

Figure 6:
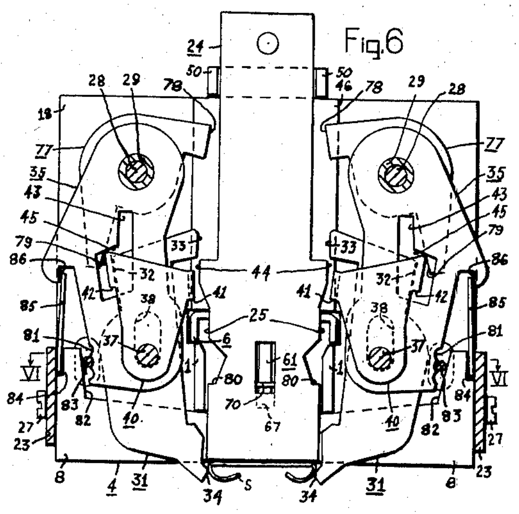
Figure 6 is an end view elevation similar to Figure 4 showing the parts after a staple has been completely driven with the anvil plate locking arms shifted into their locked position and it corresponds to Figure 3.
Figure 7:
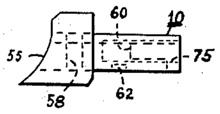
Figure 8:
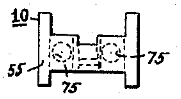
Figure 10:
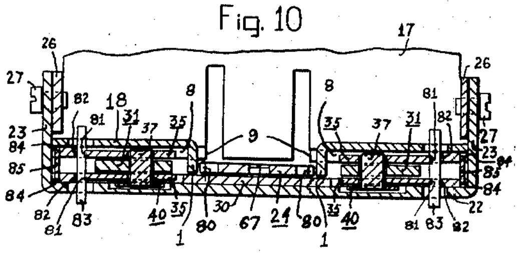
Figure 9:
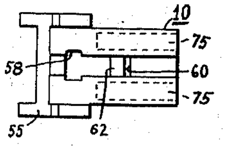
Figure 11:
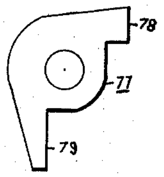
Figure 12:
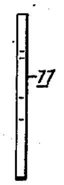
Figure 13:
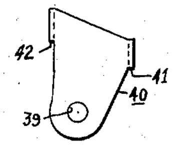
Figure 14:
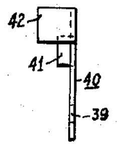
Figure 15:
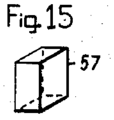
Figure 16:
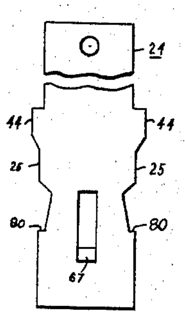
Figure 17:
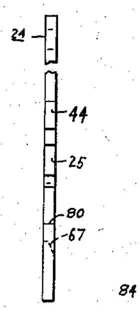
Figure 18:
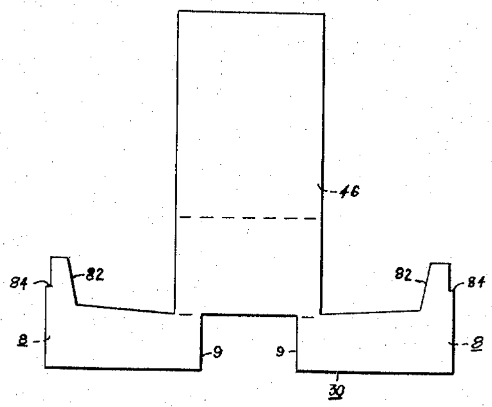
Figure 19:
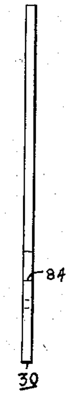
Figure 20:
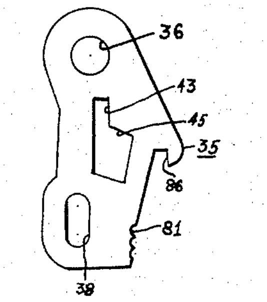
Figure 21:
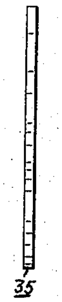
Figure 22:
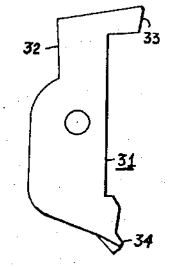
Figure 23:
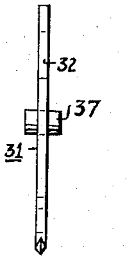

Figure 7 is a vertical longitudinal view of the support bar;

Figure 8 is an end view of Figure 7;

Figure 9 is a plan view of Figure 7;

Figure 10 is a plan view through VI—VI of Figure 6 to illustrate the positions of the parts;

Figure 11 is a plan view of one of the anvil plate arms;

Figure 12 is a side view of Figure 11;

Figure 13 is a plan view of one of the anvil locking arms;

Figure 14 is a side view of Figure 13;

Figure 15 is an enlarged perspective view of the dog which is reciprocably mounted in the support bar;

Figure 16 is a plan view of the driver;

Figure 17 is a side view of the driver;

Figure 18 is a plan view of the hardened front wearing plate with dashed lines illustrating that the two lower corners are used as two rear wearing plates 8 and that the upper portion above the horizontal dash lines is used as a rear spacer plate 46;

Figure 19 is a side view of Figure 18;

Figure 20 is a plan view of one of the four of the adjustable anvil plate guide arms;

Figure 21 is a side view of Figure 20;

Figure 22 is a plan view of one of the anvil plates and Figure 23 is a side view thereof.

The stitcher has a frame 4 which has a vertically extending rear plate 18 adjacent to and across the front end of the stitcher to support a wear plate 46 which acts to guide the rearwardly side of the driver 24. The rear plate 18 has upper spaced-apart parallel vertical flanges 50 extending forwardly a short distance which act as sidewardly guides for the upper sidewardly edges 25 of the driver 24 to hold it in proper alignment as it is reciprocated vertically in relation to the frame 4. A centrally located notched opening is provided at the lower end of the rear plate 18 and a section of each of the vertical edges of the notched opening are provided with flanges 1 which extend forwardly a short distance to provide sidewardly guides for staples fed into position beneath the driver 24 and to guide the lower ends of the sidewardly edges 25 of the driver 24 as it descends to drive the staple. See Figures 2 and 10.

Frame 4 has a horizontal base plate 17 extending towards the opposite end of the stitcher to act as a base. The conventional U-shaped staple guide 2 extends longitudinally in the stitcher and the outside of its web 3 is attached centraly to the upper side of base plate 17 with the forwardly ends of flanges 5 of the staple guide 2 terminating at the rearwardly side of the driver 24 for guiding staples into position beneath it. The inverted U-shaped staples S straddle the flanges 5 of the staple guide 2 and the web 7 of an inverted U-shaped holddown member 6 overlies the staples to hold them in proper alignment on the staple guide 2.

A pulley 16 is mounted on shaft 15 that has its ends supported in the forwardly ends of flanges 5 of the staple guide 2. A feeder spring 12 is looped around pulley 16 with its lower end 13 held by a rearwardly positioned lug 19 turned up from the web 3 of the staple guide 2 and the other end 14 of spring 12 is attached to the depending lug 20 on the conventional inverted U-shaped pusher 21 to urge it to push staples S along the staple guide 2 to a position beneath the driver 24. See Figures 1 and 2.

Identical left and right hand rear wearing plates 8 are secured flatwise an equal distance from the center of the stitcher to the lower part of the forwardly side of the rear plate 18 of the frame 4. The rear wearing plates 8 have short vertically extending edges 9 that act as sidewardly guides to properly position the movable support bar 10 which will be described later and a section of the forwardly facing sides of the rear wearing plates 8 adjacent to their vertical edges 9 acts as a rearwardly guide for the back of the legs of a staple as it is ejected from the stitcher. See Figures 2, 4 and 10.

A front plate 22 is parallel to and spaced apart from the rear plate 18 of the frame 4. The front plate 22 has arms 23 extending from its lower sidewardly edges towards the opposite end of the stitcher that are attached to the sidewardly vertical flanges 26 of the horizontal plate 17 of the frame 4 by screws 27. The upper portions of the front plate 22 and the rear plate 18 are held together by screws 28 and in proper distance apart by spacer sleeves 29 mounted centrally on screws 28. A rear spacer plate 46 is attached to the forwardly side of the rear plate 18 of the frame 4 to act as a rearwardly guide for the driver 24.

A front wearing plate 30 is attached to the rearwardly facing side of the front plate 22 and it has short vertical edges 9 to match those on the rear wearing plates 8. The rearwardly facing side of the front wearing plate 30 acts as a front guide for the driver 24 and for the staples S as they are driven. The front wearing plate 30 is spaced apart from the rear wearing plates 8 to provide a working space for the anvil plates 31.

The adjustable anvil plate guide arms 35 are in spaced apart alignment and are pivoted by holes 36 at their upper ends on the spacer sleeves 29. The central portion of the anvil plates 31 are pivoted on the central portions of pins 37 which have their ends extending into the closed end slots 38 of the anvil plate guide arms 35 to guide and limit the vertical movement of the anvil plates 31. The anvil plate locking arms 40 have a hole 39 at their lower ends which pivots on the forwardly protruding ends of pins 37 and thereby are reciprocated vertically with the anvil plates 35. The locking arms 40 have outwardly positioned lugs 42 extending towards the opposite end of the stitcher which are positioned outwardly from the upper edges 32 of the anvil plates 31 and lugs 42 move in the closed L-shaped slots 43 of the guide arms 35 for reasons to be described. See Figures 2, 4, 21 and 22. The anvil plate locking arms 40 have centrally positioned lugs 41 extending a short distance towards the opposite ends of the stitcher which are adapted to bump against cams 44 of the driver 24 when it is in a lowered position to hold lug 42 of the locking arms 40 in its locked position beneath edge 45 of the guide arms 35 to thereby hold the anvil plates 31 in a lowered position during initial upward movement of the driver 24. See Figure 6.

The left and right hand anvil plates 31 are positioned flatwise and are movable between the guide arms 35. At their lower ends, the anvil plates 31 have inwardly curved projections 34 effective to bend the legs of a staple progressively as it is driven downwardly therebetween, as will be described more fully later. The projections 34 are sharpened as clearly shown in Figures 22 and 23 to facilitate penetration thereby of a thickness of material to be stapled. The inwardly edges of the upper ends of the anvil plates 31 have shaped portions 33 to bear on the outwardly edges 25 of the driver 24 and this limits outward movement of the projections 34 when the upper ends of the anvil plates 31 are in contact with the edges 25 of the driver 24.

The plate-like driver 24 moves vertically between the forwardly side of the rear wearing plates 8 and the rearwardly facing side of the front wearing plate 30 and it can be reciprocated by hand or mechanical means to eject a staple downwardly from the stitcher. See Figures 2, 4 and 6.

A movable hardened support bar 10 has a rectangular body portion which extends rearwardly, its parallel sides extend longitudinally and are guided longitudinally by the inwardly sides of flanges 5 of the staple guide 2 with its aligned upper and bottom surfaces being guided during longitudinal movement by the upper side of the base plate 17 of the frame 4 and by the downwardly facing edges 52 of flanges 53 of the inverted U-shaped bracket 54. The inverted U-shaped bracket 54 is secured to and between the forwardly ends of flanges 5 of the staple guide 2. The support bar 10 has a curved face 55 at its forwardly end which normally extends between the vertical edges 9 of the rear wearing plates 8 and the aligned vertical edges 9 of the front wearing plate 30. The sidewardly portions adjacent to the curved face 55 of the support bar 10 are guided by the vertical edges 9. See Figures 1 and 2. The dog 57 is a small substantially rectangular shaped piece of hardened steel and it is reciprocated vertically in a close-fitting guide 58 located centrally in the forwardly end of the support bar 10. A portion of the internal part of the support bar 10 is removed to provide space for a flat spring 59 which has one end pressing against the lower end of the dog 57 to constantly urge it upwardly into engagement with the lower edge of the control arm 61 for reasons that will be explained later. The central portion of spring 59 rests on the upper side of cross-bar 62 of the support bar 10 and the opposite end of spring 59 bears on the underside of seat 63 of the support bar 10. See Figures 2, 8, 9, 10, 13 and 14.

The control arms 61 are pivoted on the center portion of shaft 64 which has its transversely extending ends supported in flanges 53 of the inverted U-shaped bracket 54. The upper part of the control arm 61 has a forwardly extending lug 66 adapted to control counterclockwise rotation of control arm 61 on shaft 64 by its engagement with the rearwardly facing angled section 67 in the body portion of the driver 24 as the driver is reciprocated. The lower edge of the control arm 61 is notched and it has a forwardly facing surface 68 adapted to engage the rearwardly facing side of the upper end of the dog 57 to restrict movement of the support bar 10 by a staple being ejected by the driver 24. A downwardly facing cam section 69 of the control arm 61 presses against the upper end of dog 57 and as the cam section 69 moves counterclockwise it moves downwardly to thereby urge dog 57 downwardly beyond the reach of face 68 of the control arm 61 to release the dog 57 and against the resistance of spring 59 to thereby permit the U-shaped end 70 of spring 71 to pivot the control arm 61 clockwise to its starting position shown in Figure 1. See Figures 1 and 3. The central portions of legs 72 of spring 71 are against the upper side of pulley shaft 15 and the ends of legs 72 are held downwardly under lugs 73 which are pressed inwardly from flanges 53 of bracket 54 at a point rearwardly from shaft 15. Two compression springs 74 have their forwardly ends in horizontal positioned holes 75 of the support bar 10 for urging it forwardly and the other ends of springs 74 press against lugs 76 of the staple guide 2.

Left and right hand anvil plate arms 77 are pivoted on the central portions of spacer sleeves 29 between the anvil plate guide arms 35. The upper ends 78 of the anvil plate arms 77 are adapted to be swung upwardly a limited amount and held steady by the cam section 44 of the driver 24 as it is moved upwardly to thereby swing the depending portions 79 of the anvil plate arms 77 against the outwardly sides of flanges 42 of the anvil plate locking arms 40 to pivot them on pins 37 to move flanges 42 inwardly from confinement under edges 45 to the vertical portion of slot 43 of the anvil plate guide arms 35. The inwardly sides of flanges 42 of the anvil plate locking arms 40 are adapted to contact edges 32 on the upper ends of anvil plates 31 to move them inwardly and thereby move shaped portions 33 of the anvil plates 31 into notches 80 of the driver 24 as it moves upwardly to thereby move the anvil plates 31, pins 37 and the anvil plate locking arms 40 upwardly with the driver 24 with the outwardly sides of lugs 42 of the anvil plate locking arms sliding along the vertical inwardly sides of the depending portions 79 of the anvil plate arms 77.

Figure 1:
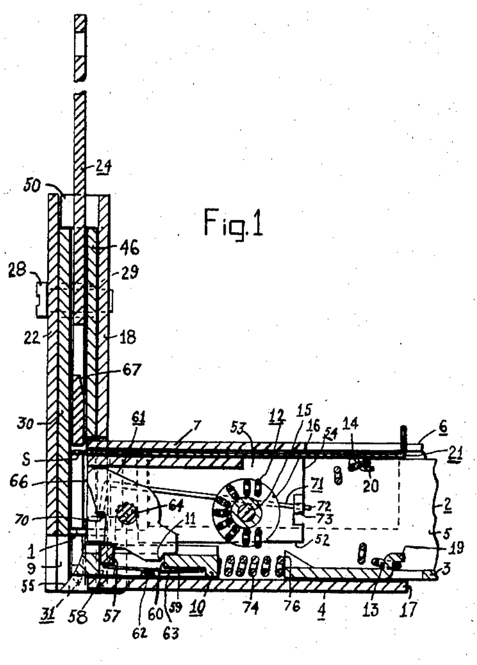
Figure 1 is a vertical longitudinal section through the stitcher mechanism with the parts in their starting position.
Figure 2:
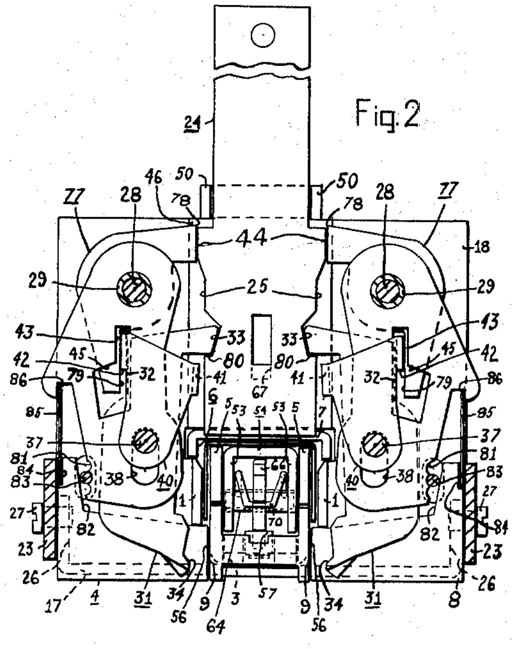
Figure 2 is an end elevation with those parts forwardly from the driver removed to illustrate the parts in the same position shown in Figure 1.

It will be noted in Figures 1 and 2 that the lower outwardly edges of the anvil plate guide arms are notched at 81 and that the front 30 and rear 8 wearing plates have inwardly facing angled portions 82 with longitudinally extending left and right hand pins 83 set in notches 81 and resting against the angled surfaces 82. It will be apparent that movement of pin 83 along the angled surfaces 82 and along notches 81 will swing the lower ends of the anvil plate guide arms 35 transversely to thereby shift the pivot pin 37 of the anvil plates 31 to adjust them so that they will impart various curves to the legs of a staple as it is ejected.

The structure of the preferred form of the improvements having been described, the operation of the device is as follows: Assuming that the parts are initially in the positions indicated in Figures 1 and 2 and that a supply of staples is in position on the staple guide bar 5 with the leading staple in position beneath the driver 24, the stitcher is placed on the multiple thickness of material to be secured together. The driver 24 is moved downwardly in fastener applying direction by any suitable means and as the driver 24 is moved downwardly, its lower end moves the leading staple S downwardly with the staple's legs straddling the sidewardly portions 56 and the underside of the staple's crown rubbing along the curved face 55 of the support bar 10 to thereby shift it progressively towards the opposite end of the stitcher. See Figures 1, 2, 3, 4 and 6. When the support bar 10 starts to be moved rearwardly, as described above, the rearwardly side of the upper end of the dog 57 contacts surface 68 of control arm 61 and rotates it counterclockwise on shaft 64 to thereby shift lug 66 of control arm 61 into restrictive engagement with the rearwardly facing angled section 67 of the driver 24 to thereby rigidly limit yet permit shifting of the support bar 10 with the downward movement of the driver 24.

During the initial downward movement of the driver 24, its cams 44 are in alignment and engagement with the upper ends 78 of the anvil plate arms 77 with the vertical inwardly sides of its depending portions 79 against the outwardly sides of flanges 42 of the anvil plate locking arms 40 with the upper outwardly edges 32 of the anvil plates 31 being against the inwardly sides of flanges 42 of the anvil plate locking arms 40 to hold the anvil plates 31 from pivoting clockwise on pin 37 and to thereby hold the shaped ends 33 of the anvil plates 31 confined in notches 80 of the driver 24 to facilitate vertical movement of the anvil plates 31 and further that the anvil plates 31 are in a raised position in the stitcher with the ends of pins 37 being upwardly in slots 38 of the anvil plate guide arms 35. See Figures 1 and 2.

Figure 3:
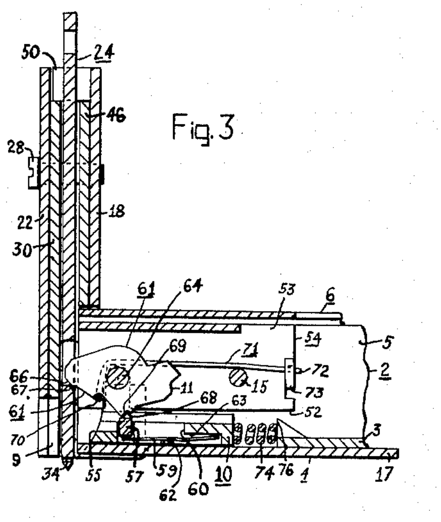
Figure 3 is a vertical longitudinal section through the stitcher with the parts shown after a staple has been driven.
Figure 4:
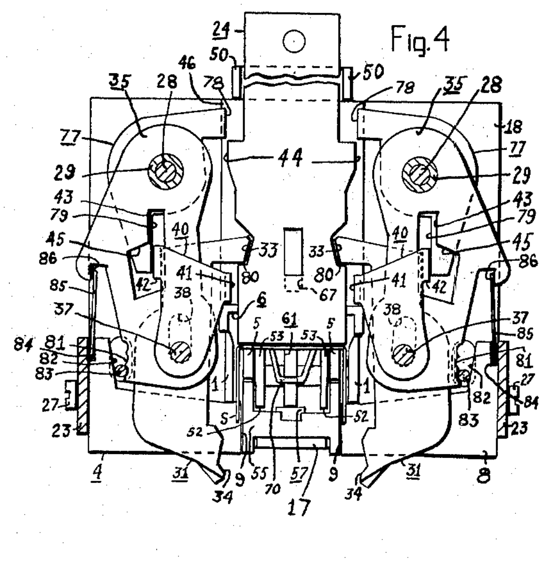
Figure 4 is an end elevation similar to Figure 2 but showing the driver as having been lowered to thereby partially drive a staple and showing the driver as having moved the anvil plates downward until their projections extend out of the stitcher to thereby penetrate material to be stapled.
Figure 5:
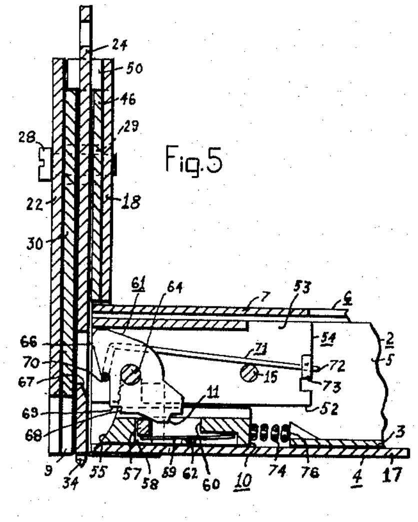
Figure 5 is a vertical longitudinal view in section with the parts in the same position shown in Figure 3 but showing the control arm released from engagement with the dog on the support bar and as having been returned to its starting position by spring 71.

The anvil plates 31, pins 37 and the anvil plate locking arms 40 are moved downwardly by the driver 24 until the pins 37 are stopped on reaching the closed lower ends of slots 38 (Figure 4) of the anvil plate guide arms 35 with the outwardly sides of flanges 42 of the anvil plate locking arms 40 sliding along the vertical depending portions 79 of the anvil plate arms 77 and at this point, it will be observed in Figure 4 that cams 44 of the driver 24 have moved past the upper ends 78 of the anvil plate arms 77 to thereby permit the depending portions 79 of the anvil plate arms 77 to move outwardly as the driver 24 continues downwardly. It will be observed in Figures 3 and 4 that the sharpened projections 34 of the die plates 31 were moved downwardly out of the stitcher to thereby penetrate material and that continued downward movement of the driver 24 forces the shaped upper ends 33 of the anvil plates 31 to follow the outwardly sloping contour of the outwardly edges 25 and cams 44 (Figure 6) of the driver 24 to thereby shift projections 34 of the anvil plates 31 inwardly to their staple-bending position and moves flanges 42 of the anvil plate locking arms 40 outwardly under the confining edge 45 of the anvil plate guide arms 35 with cams 44 of the driver 24 moving downward to an aligned position adjacent the inwardly sides of flanges 41 of the anvil plate locking arms 40 to hold its flange 42 outwardly under edge 45 of the anvil plate guide arms 35. See Figure 6. As the ends of the staple's legs are engaged by the projections 34 of the anvil plates 31, they are curved inwardly around the lower outwardly corners of the support bar 10, as shown in Figure 6. As this inward curving of the staple's legs commences, the upper portions of the staple's legs are held against inward bending by the outwardly sides 56 of the support bar 10 which still projects between the staple legs.

On further descent of the driver 24, the curving of the staple legs continuous progressively, to effect a tight clinching by the time the driver reaches its lowermost position, as shown in Figure 6. The depth to which the staple legs penetrate depends on the curvature imparted thereto and this in turn is governed by the initial setting of the projections 34. This setting may be adjusted, as already explained, by shifting the lower ends of the anvil plate guide arms 35 by moving pin 83 along the angled edges 82 in notches 81 to change the position of slot 38 of the anvil plate guide arms 35 to thereby change the position of pin 37 on which the anvil plates 31 pivot.

When the driver 24 has reached the lowermost position shown in Figures 3 and 6, the cam section 69 of the control arm 61 has shifted the dog 57 downwardly out of engagement with section 68 of control arm 61 and end 70 of spring 71 moves the control arm 61 clockwise to its starting position on shaft 64 with the rearwardly facing stop 11 of control arm 61 being in position to stop forwardly movement of the abutment 60 of support bar 10 to limit its forwardly movement by springs 74. See Figures 1 and 3.

After a staple has been secured as just described, the driver 24 is moved upwardly with its cams 44 moving past flanges 41 of anvil plate locking arms 40 and into engagement with the upwardly ends 78 of the anvil plate arms 77 to pivot them to move their depending ends 79 inwardly to shift flanges 42 of the anvil plate locking arms 40 inwardly out of confinement under edges 45 of anvil plate guide arms 35 and against edges 32 of anvil plates 31 to move their upper ends 33 into notches 80 of driver 24 as it is raised to thereby move the anvil plates 31, pin 37 and anvil plate locking arms 40 upwardly to the starting position shown in Figs. 1 and 2.

The upper outwardly edges of the front 30 and rear 8 wearing plates are notched at 84 (Figures 2 and 6) to provide a slight space at the inwardly sides of flanges 23 of front plate 22 and the lower end of a flat spring 85 is secured therein with its upper end exerting outwardly pressure against the inwardly sides of notches 86 of the anvil plate arms 35 to constantly urge their notch 81 ends outwardly into engagement with pins 83.

I claim:

1. Stapling mechanism comprising a frame, a driver with cam surfaces reciprocable therein, a staple guide adapted to guide staples to a position in the path of said driver, pivoted anvil plates which have projections at their lower ends for piercing material to be stapled and for bending the legs of a staple as it is driven downwardly, pivot means on said anvil plates and pivot guiding means for said pivot means on said frame for limiting downward movement of said anvil plates after they have penetrated said material, releasable interlocking means below said cams between said driver and the upper ends of said anvil plates for moving the anvil plates downwardly to penetrate said material, anvil plate arms operated by said driver for moving and then holding the upper end of said anvil plates in interlocking position with said driver during its upwardly movement, and means to release said anvil plates during downward movement of said driver to permit it to move its cams downwardly into engagement with the upper ends of said anvil plates to shift their projections into staple-bending position, operable anvil plate locking means connected and reciprocated with and operated by said anvil plates when they are shifted into staple-bending position, obstruction means on said frame to obstruct upward movement of said anvil plate locking means to thereby restrict upward movement of said anvil plates from their downwardly position, said anvil plate locking means moved away from said obstruction means by said anvil plate arms when said driver is moving upwardly to thereby permit said anvil plates to be moved upwardly.

2. In a machine as set forth in claim 1, a staple support bar slidably mounted in said frame, spring means for urging said support bar into staple supporting position to be engaged and progressively moved by a staple being ejected by said driver, operable dog means carried by said support bar, a pivoted control arm releasably engaged and pivoted counterclockwise by said dog as the dog is moved with said support bar, resilient means for urging said dog to engage said control arm, means on said control arm cooperating with means on said driver which limits yet permits said dog to pivot said control arm counterclockwise to progressively maintain said support bar in staple supporting position as a staple is being ejected by said driver.

3. In a machine as set forth in claim 2, cam means on said control arm adapted to move said dog out of engagement with said control arm as it is being pivoted counterclockwise to thereby break the restricting connection between said support bar and said driver to permit it to be raised without its moving said support bar.

4. In a machine as set forth in claim 1, means on said anvil plate locking means for contacting a portion of said driver when it is in a lowered position to stop said anvil plate locking means from moving away from said obstructing means.

5. Stapling mechanism comprising a frame, a driver reciprocable therein, a staple guide adapted to guide staples to a position in the path of said driver, anvil plate guide arms pivoted at their upper ends on said frame and having their lower ends movable towards and away from the path of said driver, pivoted anvil plates which have projections at their lower ends for bending the legs of a staple as it is driven downwardly, said anvil plates pivoted on the movable ends of said anvil plate guide arms for changing the positions of said anvil plates so that their projections will impart various bends to the legs of a staple as they are driven.

6. In a machine as set forth in claim 5, abutment means on said frame, adjustment means between said abutment means and the movable ends of said anvil plate guide arms for moving their ends to change the staple-bending position of said anvil plates.

7. In a machine as set forth in claim 6, spring means on said frame and exerting pressure on said anvil plate guide arms to hold them against said adjustment means.

References Cited in the file of this patent

UNITED STATES PATENTS

| | | |
|---|---|---|
| 1,591,986 | Maynard | July 13, 1926 |
| 2,431,548 | Ericsson | Nov. 25, 1947 |
| 2,722,001 | Schafroth | Nov. 1, 1955 |
| 2,722,002 | Allen | Nov. 1, 1955 |